United States Patent
Banning et al.

(10) Patent No.: US 11,845,646 B2
(45) Date of Patent: Dec. 19, 2023

(54) FAUCET ASSEMBLY FOR A BEVERAGE SERVER HAVING A DISPLACEABLE CUP TRIP LEVER DISPENSING LEVER ASSEMBLY

(71) Applicant: BUNN-O-MATIC CORPORATION, Springfield, IL (US)

(72) Inventors: Jason M. Banning, Springfield, IL (US); David Helbling, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 17/525,751

(22) Filed: Nov. 12, 2021

(65) Prior Publication Data
US 2022/0144621 A1    May 12, 2022

Related U.S. Application Data

(60) Provisional application No. 63/112,866, filed on Nov. 12, 2020.

(51) Int. Cl.
*B67D 3/00* (2006.01)
*F16K 31/524* (2006.01)

(52) U.S. Cl.
CPC ...... *B67D 3/0025* (2013.01); *F16K 31/52408* (2013.01)

(58) Field of Classification Search
CPC ....... B67D 3/02; B67D 3/0025; F16K 31/528; F16K 31/52458
USPC .................................. 141/362; 222/442, 445
See application file for complete search history.

(56) References Cited

U.S. PATENT DOCUMENTS

| | | |
|---|---|---|
| 939,069 A | 11/1909 | McLean |
| 2,066,169 A | 12/1936 | Zwosta |
| 2,610,019 A | 9/1952 | Beall |

(Continued)

OTHER PUBLICATIONS

Cal-Mil, "All-In-One Hands-Free Spigot," accessed via the Internet at: https://calmil.com/products/browse-categories/health-and-safety/all-in-one-hands-free-spigot.html, (believed to be publicly available at least by May 24, 2020).

(Continued)

*Primary Examiner* — Timothy L Maust
(74) *Attorney, Agent, or Firm* — Barnes & Thornburg LLP

(57) ABSTRACT

The apparatuses and methods disclosed herein, along with contemplated variants thereof, provide several advantages over known systems for actuating the faucet of a beverage server. In conventional designs, a faucet of a beverage server is provided in the lower portion of a reservoir, such that a beverage from the reservoir is distributed to the spigot through a gravity-driven process. In operation, many of these servers are utilized as service industry coffee servers for restaurants and banquet halls. Employees who are handling the brewing equipment will often place servers used with the brewing equipment directly in a sink for cleaning or filling, such that the base of that sink acts as a horizontal surface. Absent the ability of the lever assembly to fold into an up position, this operation would result in putting unnecessary force on the lever assembly. Accordingly, a multi-position, hands-free actuation system is disclosed herein.

11 Claims, 12 Drawing Sheets

(56) References Cited

U.S. PATENT DOCUMENTS

| | | | | |
|---|---|---|---|---|
| 3,460,723 | A | * | 8/1969 | Young .................... G01F 11/32 |
| | | | | 222/453 |
| 3,904,174 | A | | 9/1975 | Giese |
| 4,111,243 | A | | 9/1978 | Fetterman |
| 4,138,092 | A | | 2/1979 | Apellaniz |
| 4,210,262 | A | * | 7/1980 | Donaldson ............. G01F 11/32 |
| | | | | 222/445 |
| 4,252,160 | A | | 2/1981 | Numbers |
| 4,784,300 | A | * | 11/1988 | Lees ....................... G01F 11/32 |
| | | | | 222/453 |
| 4,905,875 | A | | 3/1990 | Straiton |
| 4,938,386 | A | | 7/1990 | Roethel et al. |
| 6,230,769 | B1 | | 5/2001 | O'Brien |
| D506,634 | S | | 6/2005 | Maddux |
| D506,889 | S | | 7/2005 | McDaniel et al. |
| 6,964,351 | B2 | * | 11/2005 | Jablonski ................. F25C 5/24 |
| | | | | 141/82 |
| 6,988,641 | B2 | | 1/2006 | Jones et al. |
| 7,614,528 | B2 | * | 11/2009 | Jeong ................... B67D 3/0003 |
| | | | | 222/453 |
| 7,753,231 | B2 | | 7/2010 | Giles |
| 8,196,779 | B1 | | 6/2012 | Czarnecki |
| 9,376,304 | B2 | | 6/2016 | Trulaske |

OTHER PUBLICATIONS

Cal-Mil, "Commercial Style Spigot Adapter,"accessed via the Internet at: https://calmil.com/products/browse-categories/health-and-safety/commercial-style-spigot-adapter.html, (believed to be publicly available at least by May 24, 2020).

Cal-Mil, "Retro-Fit Hands-Free Spigot Adapter,"accessed via the Internet at: https://calmil.com/products/browse-categories/health-and-safety/retro-fit-hands-free-spigot-adapter.html, (believed to be publicly available at least by May 24, 2020).

FETCO, "L4D-20TLA," accessed via the Internet at: https://www.fetco.com/pl.product,155.html (The actual publication date of this reference is not known by Applicant. The date when the Web page was accessed is at least as early as Oct. 29, 2020 on which date the document appears to have been available as a oublication (MPEP 609.04(a))).

Hamilton Beach, "Coffee Makers," accessed via the Internet at: https://hamiltonbeach.com/coffee-makers?filter=coffee+urns&search=undefined, (The actual publication date of this reference is not known by Applicant. The date when the Web page was accessed is Oct. 29, 2020 on which the document appears to have been available as a publication. (MPEP 609.04(a))).

Hotel Restaurant Supply, "Hands Free Spigots" accessed via the Internet at: https://www.hotelrestaurantsupply.com/mm5/merchant.mvc?Screen=SEARCH&q=spigot+adapter, (The actual publication date of this reference is not known by Applicant. The date when the Web page was accessed is at least as early as Jul. 15, 2021 on which date the document appears to have been available as a publication. (MPEP 609.04(a))).

Hubert, "Stainless Steel Hands Free Spigot Adapter," accessed via the Internet at: https://www.hubert.com/product/15122/HUBERT--Stainless-Steel-Hands-Free-Spigot-Adapter---7-7-10-L-x-2-1-4-W-x-1-2-D?searchTerm=coffee, (The actual publication date of this reference is not known by Applicant. The date when the Web page was accessed is at least as early as Jul. 15, 2021 on which date the document appears to have been available as a publication. (MPEP 609.04(a))).

Marco Beverage Systems, "Hands-Free Tap Adapter," accessed via the Internet at: https://marcobeveragesystems.com/products/hands-free-tap-adapter/ (The actual publication date of this reference is not known by Applicant. The document may have been available as a publication Apr. 13, 2021 based on the "date premiered" on the linked YouTube video. (MPEP 609.04(a))).

Newco Enterprises, Inc., "Newtap—Designed for Glass and Thermal Brewers," accessed via the Internet at: https://www.newcocoffee.com/wp-content/uploads/2020/11/Newtap_SpecSheet_11.6.2020.pdf (The actual publication date of this reference is not known by Applicant. The document may have been available as a publication Nov. 6, 2020 based on the date that appears to have been embedded in the link. (MPEP 609.04(a))).

Newco Enterprises, Inc., "No Touch Handle," accessed via the Internet at: https://www.newcocoffee.com/wp-content/uploads/2020/08/LARGE_no_touch_handle_.pdf, (The actual publication date of this reference is not known by Applicant. The document may have been available as a publication Aug. 2020 based on the date that appears to have been embedded in the link. (MPEP 609.04(a))).

Service Ideas, "Hands-Free Spigots, Touchless Dispensing Option," accessed via the Internet at: https://www.serviceideas.com/hands-free-spigs.html, (The actual publication date of this reference is not known by Applicant. The date when the Web page was accessed is at least as early as Oct. 29, 2020 on which date the document appears to have been available as a publication. (MPEP 609.04(a))).

Tablecraft, Rectangular Duel Beverage Dispenser, accessed via the Internet at: https://www.tablecraft.com/Rectangular-Duel-Beverage-Dispenser (The actual publication date of this reference is not known by Applicant. The date when the Web page was accessed is at least as early as Oct. 29, 2020 on which date the document appears to have been available as a publication (MPEP 609.04(a))).

Tablecraft, "Universal Touchless Faucet," accessed via the Internet at: https://www.tablecraft.com/Universal-Touchless-Faucet (The actual publication date of this reference is not known by Applicant. The date when the Web page was accessed is at least as early as Oct. 29, 2020 on which date the document appears to have been available as a publication (MPEP 609.04(a))).

Tomlinson, "No Drip® Division," accessed via the Internet at: https://www.daslos-studios.com/ClientMedia/6ee55b94-25b7-4735-a9d3-0e21daafef20/0124b9b6-65ce-445e-a293-d79ed7c0e41b.pdf, (The actual publication date of this reference is not known by Applicant. The date when the Web page was accessed is at least as early as Oct. 29, 2020 on which date the document appears to have been available as a publication. (MPEP 609.04(a))).

Wilber Curtis, "New Touchless Adapters Convert Existing Curtis Dispensers to a Touchless Program," accessed via the Internet at: https://www.wilburcurtis.com/post/new-touchless-adapters-convert-existing-curtis-dispensers-touchless-program (Aug. 13, 2020).

* cited by examiner

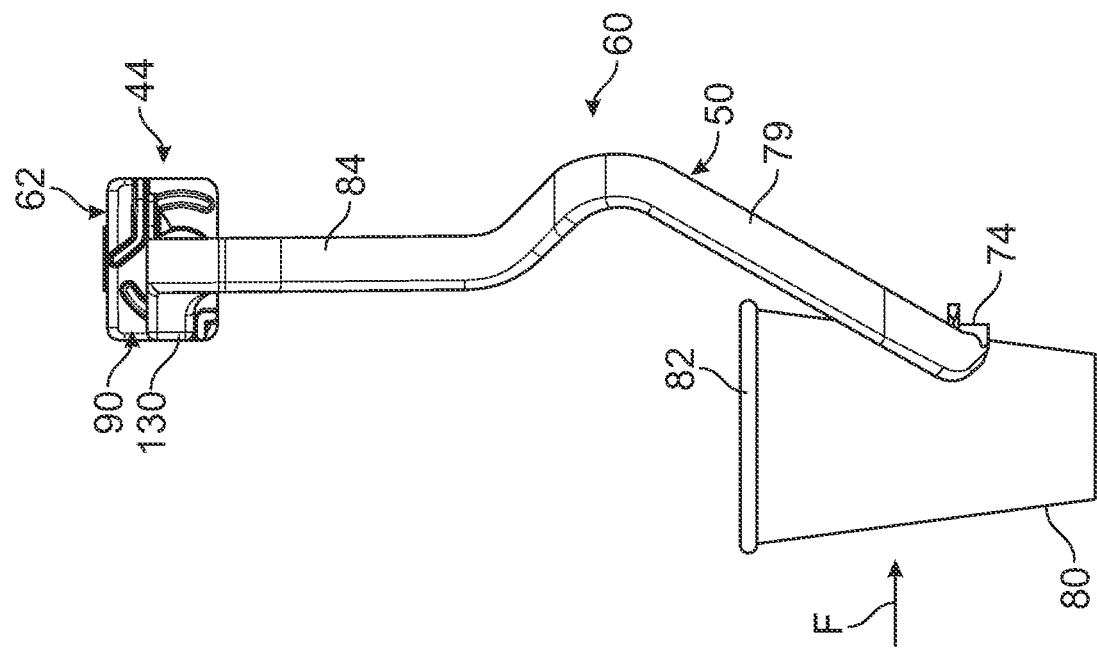
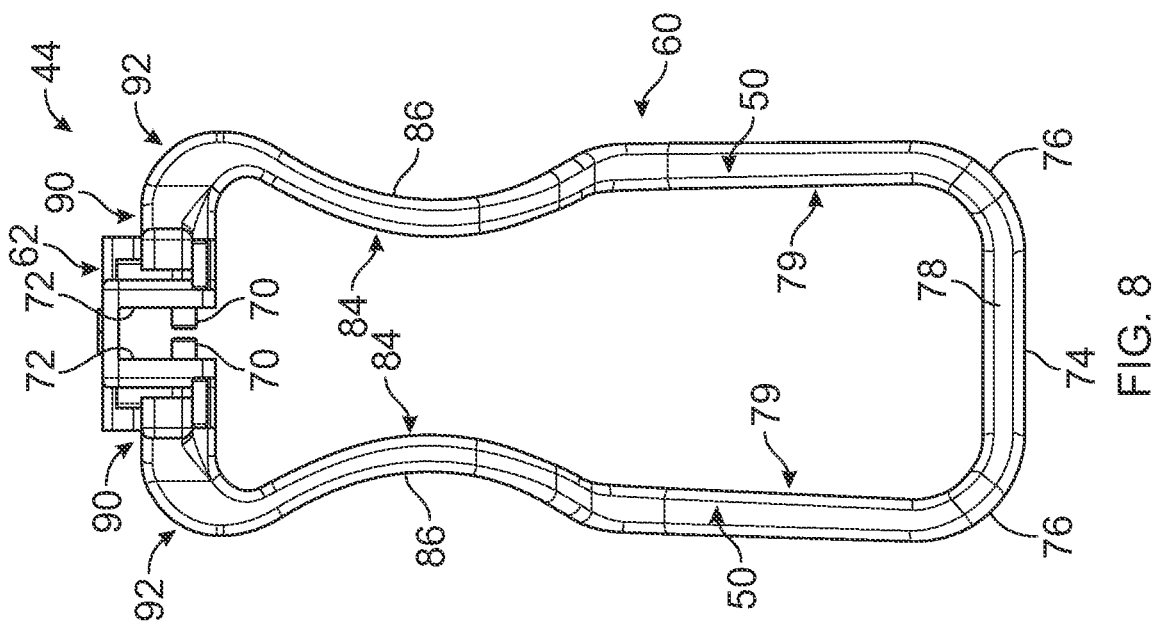

FAUCET ASSEMBLY FOR A BEVERAGE SERVER HAVING A DISPLACEABLE CUP TRIP LEVER DISPENSING LEVER ASSEMBLY

CROSS REFERENCE TO RELATED APPLICATIONS

This application claims the benefit of priority under 35 U.S.C. § 119(e) to U.S. Provisional Patent Application No. 63/112,866, filed Nov. 12, 2020. The disclosure set forth in the referenced application is incorporated herein by reference in its entirety.

FIELD OF THE INVENTION

The present disclosure pertains generally to actuation assemblies for beverage servers, including embodiments that provide hands-free beverage server actuation assemblies.

BACKGROUND

By way of background, a cup trip lever assembly is one which attaches to a fluid dispensing faucet such as is used for dispensing beverages from a reservoir, and which uses the pressure of a cup pressed against the lever or the release of such pressure, to respectively open or close a dispensing valve. Several varieties of cup trip lever assemblies have been developed in the prior art, including expired U.S. Pat. No. 4,938,386 shows a cup trip lever that includes a lever portion attached to a valve with spaced legs 80, 82 extending downwardly meeting in and adjoined at a cup engaging member 84. A user holding a cup can press the cup wall against the member 84 causing displacement of the legs and movement of the associated member to open the valve. A similar cup trip lever can be seen in expired U.S. Design Pat. Nos. D506,634 and D506,899 which shows a cup trip level in a lower portion of the entire assembly. The cup trip lever has a downwardly extending portion below a nozzle portion of the faucet. The lever extends upwardly along the faucet to a position above the faucet wherein it is engaged with a shaft connected to or otherwise associated with a valve or plunger inside the faucet. Once again, pressure against a horizontal member on the cup trip lever causes displacement of the valve in the faucet to permit dispensing of beverage from the reservoir.

Similar cup trip levers can also be seen in various manufactures catalogs including the Tomlinson catalog www.tomlinsonind.com, in the OEM Components section, referencing the HFS-Cup Trip Handle. The Tomlinson HFS-Cup Trip Handle permits one-handed dispensing. This configuration is similar to that as disclosed in the above-referenced patents.

One of the problems that occurs with these cup trip levers is when they are used on beverage servers having dimensions configured for use on a stand that elevates the servers above the surrounding surface such as a countertop. In such instance, the assembly can be damaged when the beverage server is removed from the stand. This problem arises because the dimension between a bottom end of the faucet and a bottom of the reservoir is designed to prevent the end of the faucet from touching a surface, such as a counter top, on which the reservoir is placed. This configuration works well when the faucet includes a typical handgrip faucet tap-handle actuator positioned at the top of the faucet. When the same server has a faucet assembly using a cup trip lever-type faucet actuator, the cup trip lever extends below the end of the faucet nozzle and below the bottom of the server. As a result, placement of the server on a countertop rather than on the base can damage or break the cup trip lever, remove the lever from the faucet, and or actuate the faucet valve as a result of the damaged lever controlling the faucet valve.

This background information is believed by the applicant to be of possible relevance to the present disclosure. No admission is intended, nor should such admission be inferred or construed, that any of the preceding information constitutes prior art against the present invention. Other aims, objects, advantages and features of the invention will become more apparent upon reading of the following non-restrictive description of specific embodiments thereof, given by way of example only with reference to the accompanying drawings.

BRIEF DESCRIPTION OF THE DRAWINGS

The present disclosure is described hereafter with reference to the attached drawings that are given as a non-limiting example only. Embodiments of the present disclosure are provided with reference to the appended drawings, wherein:

FIG. 4 shows the lever assembly ready for dispensing in the "closed" valve position; FIG. 5 shows the lever assembly displaced to a position during operation in which the valve is "opened" as a result of the movement of a lever operating on an adaptor attached to the valve; and FIG. 6 shows a lever portion of the lever assembly in an up position to prevent it from being damaged while still maintaining the valve in a "closed" condition;

FIG. 8 is a front plan view of the lever assembly as shown in FIG. 7;

FIG. 9 is an elevated side view of the lever assembly shown in FIGS. 7 and 8 and showing the relative position of a cup for actuating the lever assembly;

FIG. 20 shows the entire lever assembly of this embodiment; FIG. 21 shows an enlarged perspective view of the adaptor of the lever assembly with the protrusions of this embodiment; and FIG. 22 shows an enlarged perspective view of the adaptor having a lever head engaged therewith relative to the protrusions on an outboard portion of the second stops.

Figure 1:
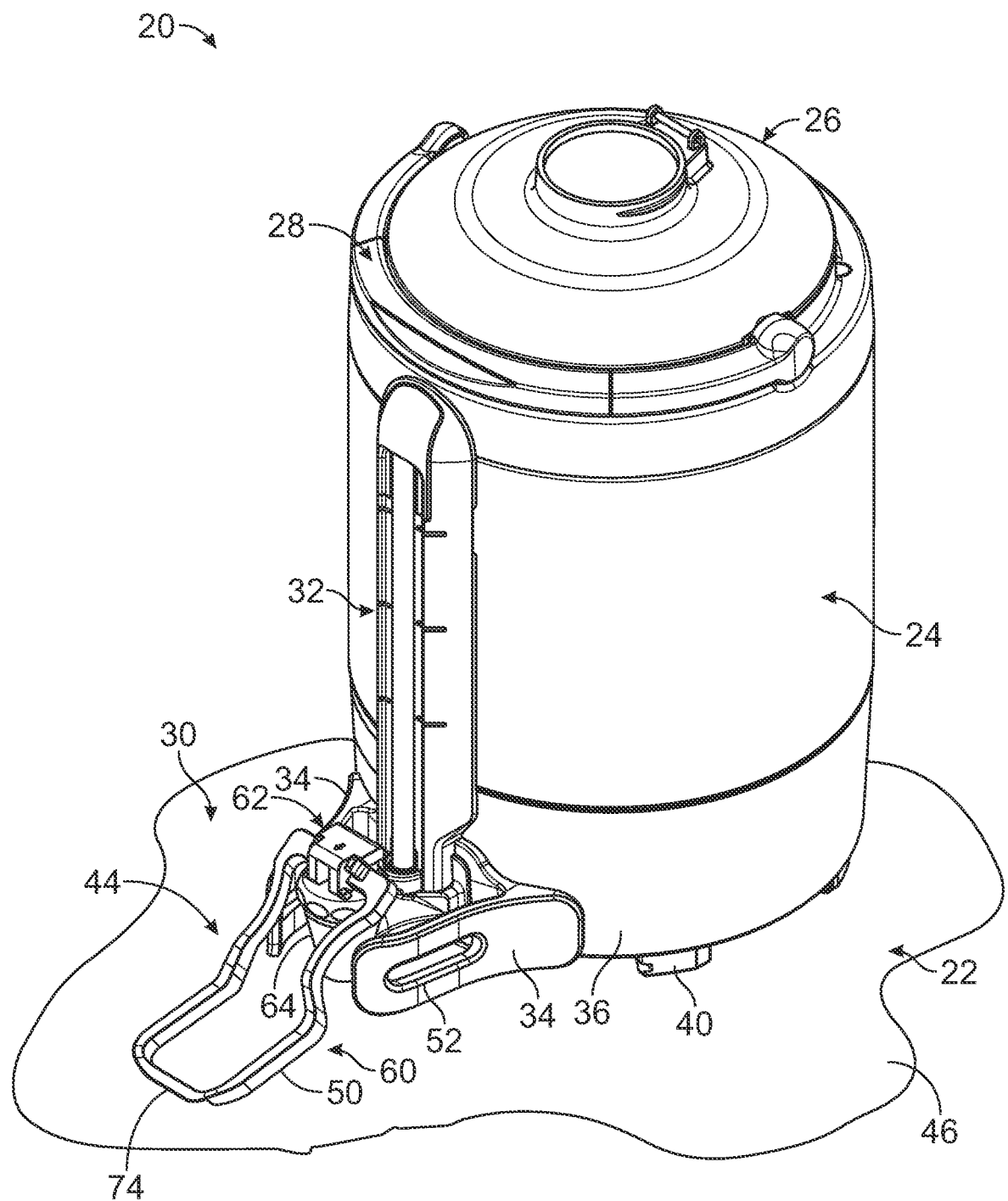
FIG. 1 shows a beverage server having a reservoir portion which communicates with a faucet assembly to facilitate controlled dispensing of beverage from the reservoir of the server.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

SUMMARY OF INVENTION

A novel apparatus for operating a faucet assembly in a beverage server comprises an adaptor, the adaptor including a bore having a first central axis. The adapter further includes a first movement surface formed with a curvature about the central axis of the bore. The adapter further includes a pin along a second central axis vertically offset from the first central axis. The apparatus further comprises a lever, and the lever includes an axle configured to interface with the bore. The novel apparatus can be operated by method where a user applies a first force to a lever, the lever transmits the first force to an adaptor, the adaptor transmits the first force through a driving surface, the driving surface engages a component of the faucet assembly with a cam- ming action, the adaptor transmits the first force to a shaft, and the shaft actuates a faucet valve.

Each of the embodiments disclosed herein, along with contemplated variants thereof, provide several advantages over designs known in the art. In conventional designs, a faucet of a beverage server is provided in the lower portion of a reservoir, such that a beverage from the reservoir is distributed to the spigot through a gravity-driven process as shown in at least FIG. 1. In operation, many of these servers are utilized as service industry coffee servers for restaurants and banquet halls. These units are often heavy when filled with liquid, and somewhat awkward to carry even when empty. Employees who are handling the brewing equipment will often place servers used with the brewing equipment directly in a sink for cleaning or filling, such that the base of that sink acts as a horizontal surface. Absent the ability of the lever assembly to fold into an up position, this operation would result in putting unnecessary force on the lever assembly, likely breaking it. Additionally, even if the lever assembly were to remain intact, the reservoir would be unable to sit flat on the horizontal surface at the base of the sink.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. In addition, it is to be understood that the phraseology and terminology used herein is for the purpose of description and should not be regarded as limiting. Furthermore, and as described in subsequent paragraphs, the specific configurations illustrated in the drawings are intended to exemplify embodiments of the disclosure. However, other alternative mechanical and/or other configurations are possible which are considered to be within the teachings of the present disclosure.

The use of various phrases and terms is meant to encompass the items or functions identified and equivalents thereof as well as additional items or functions. Unless limited otherwise, various phrases, terms, and variations thereof herein are used broadly and encompass all variations of such phrases and terms. However, other alternative structures, functions, and configurations are possible which are considered to be within the teachings of the present disclosure. Furthermore, unless otherwise indicated, the term "or" is to be considered inclusive. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical, mechanical or other connections or couplings. The terms upper, lower, and vertical are intended for operative context only and are not necessarily intended to limit the invention only to those configurations or orientations.

Figure 6:
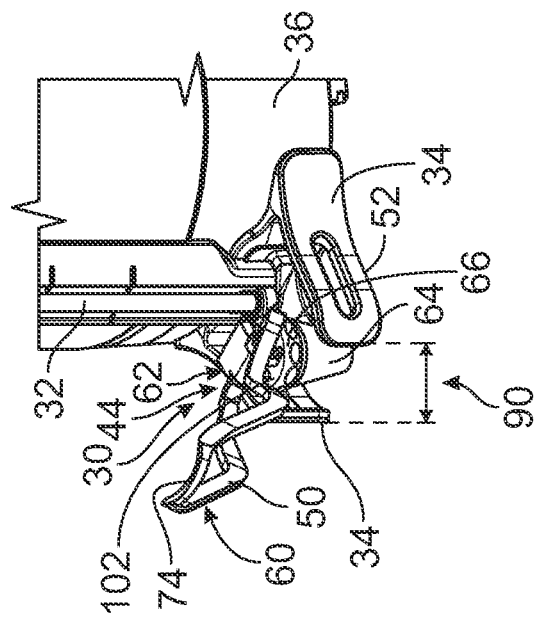
FIGS. 4-6 are progressive side perspective views showing the relationship of the lever assembly in different modes of operation.
Figure 5:
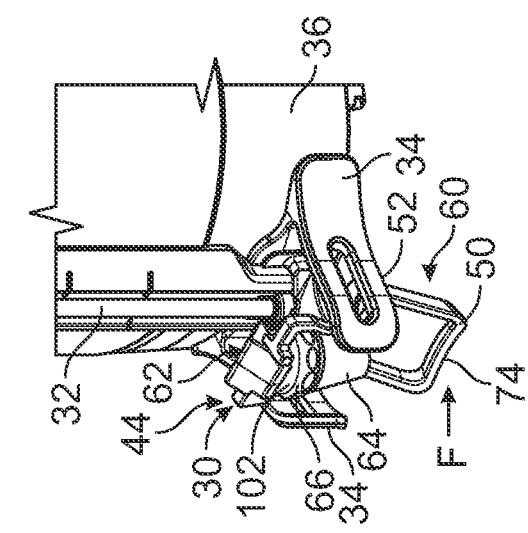
Figure 4:
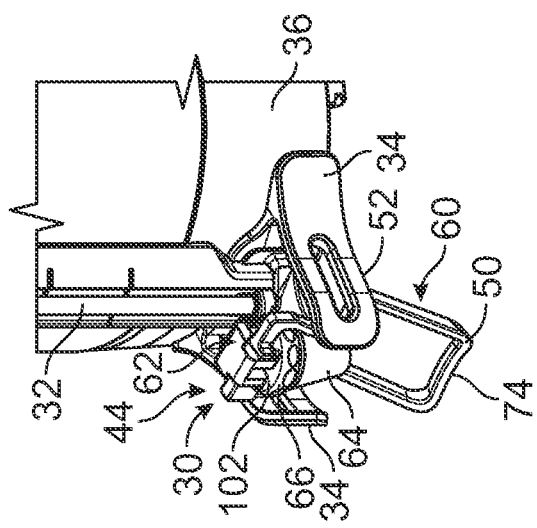

With reference to FIG. 1, a beverage server 20 is illustrated positioned on a counter or other horizontal surface 22. The beverage server 20 includes a reservoir portion 24 a cover portion 26, a bail handle 28, and a faucet assembly 30. A sight gauge 32 communicates with the faucet assembly 30 to indicate the level of beverage retained within the reservoir 24. A pair of faucet guards 34 are connected to a lower portion 36 of the reservoir 24 to protect the faucet from accidental bumps or impacts which might otherwise damage the faucet assembly 30. Feet 40 are provided on the underside of the lower portion 36 to elevate the bottom of the beverage server 20 off of the horizontal surface 22. In use, the beverage server 20 is often placed on and/or attached to a stand to elevate the faucet above the horizontal surface 22 to facilitate placement of a cup beneath the faucet assembly 30 for controlled dispensing of beverage from the reservoir 24 by operation of the faucet assembly 30. The progressive figures in FIGS. 4-6 show a configuration in which the faucet assembly 30 is configured in a closed position ready for dispensing, FIG. 5 shows the faucet assembly 30 in which a lever assembly 44 has been actuated to open a valve in the faucet and allow the dispensing of beverage from the reservoir 24, and FIG. 6 shows the faucet assembly 30 in which a lever assembly 44 has been positioned in an up position to prevent damage to one or more components and/or structures of the lever assembly 44 and/or faucet assembly 30.

Figure 2:
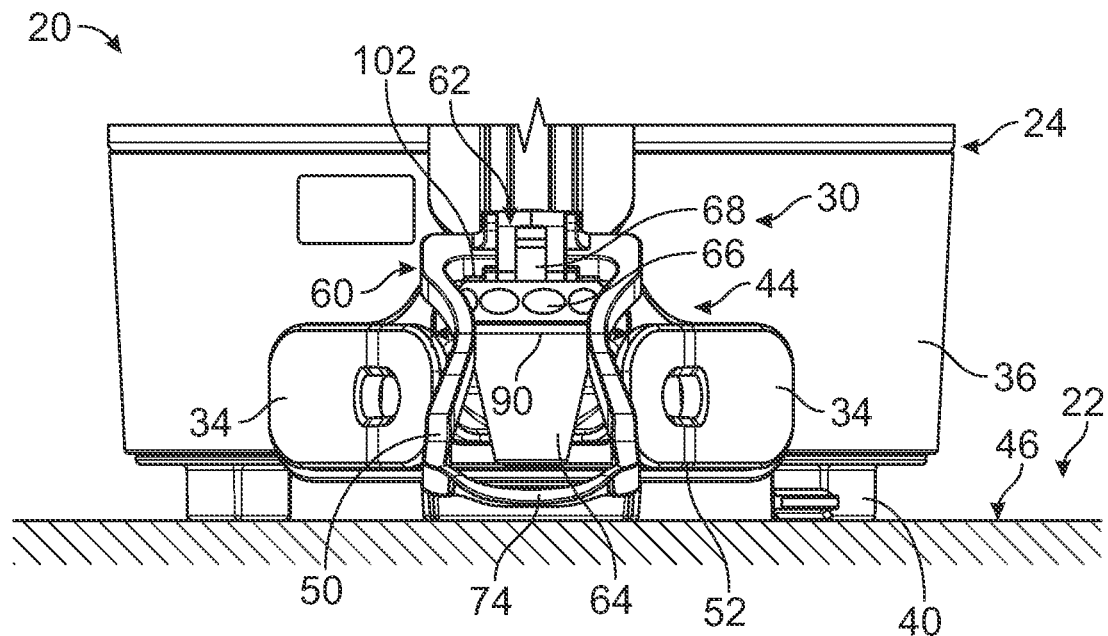
FIG. 2 shows an enlarged, front elevational view of the faucet assembly showing the relationship between a cup trip lever assembly and faucet guards on the beverage server and a nozzle portion of the faucet assembly while the beverage server is on a horizontal surface.
Figure 3:
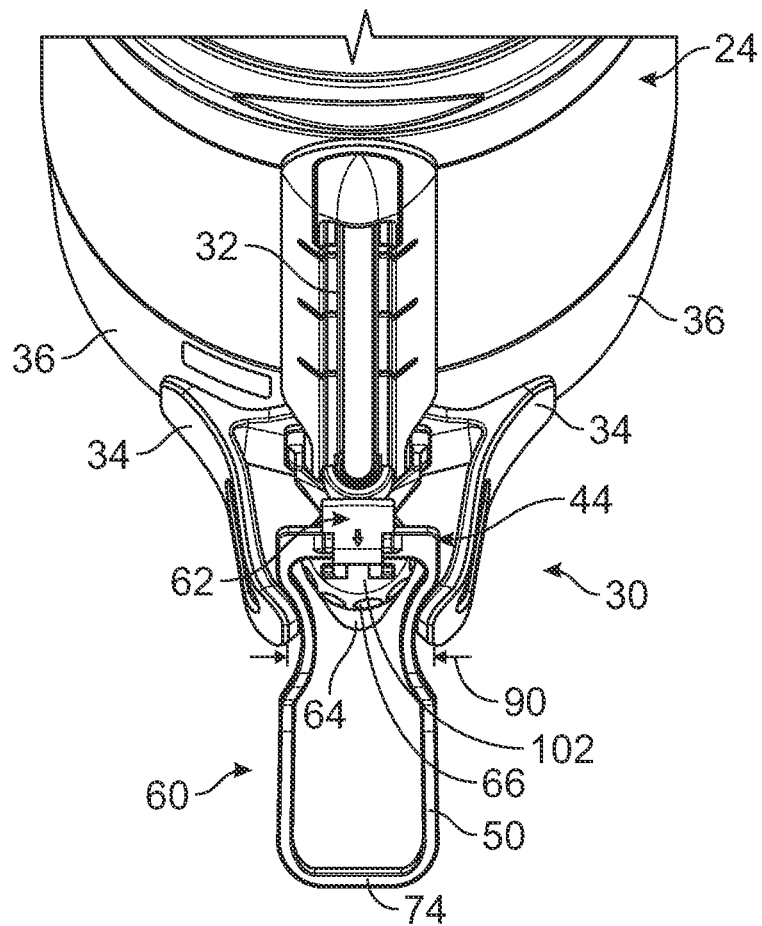
FIG. 3 is a top perspective view of the enlarged view of the faucet assembly as shown in FIG. 2 further showing the relationship between the faucet guards, lever assembly, and nozzle portion.

FIG. 2 shows an enlarged and elevated front view of the faucet assembly 30 in which the lever assembly 44 is positioned generally above the top surface 46 of the horizontal surface 22. As will be described in greater detail below, this is possible due to the structures and configurations of the lever assembly 44 to allow the lever assembly 44 to positioned in different orientations for "in service use" or dispensing (see FIGS. 4 and 5) as well as "out of service" use (see FIG. 6). As already briefly described, the images in FIGS. 4-6 show two "in service" applications (FIGS. 4 and 5) in which at least part of a lever portion 60 of the lever assembly 44 extends below the faucet guards 34. FIG. 6 shows a configuration similar to that as shown in FIGS. 1-3 in which the lever assembly 44 has been operated in order to position at least a lower portion of the lever 60 generally above the bottom edge 52 of the faucet guards 34.

Figure 7:
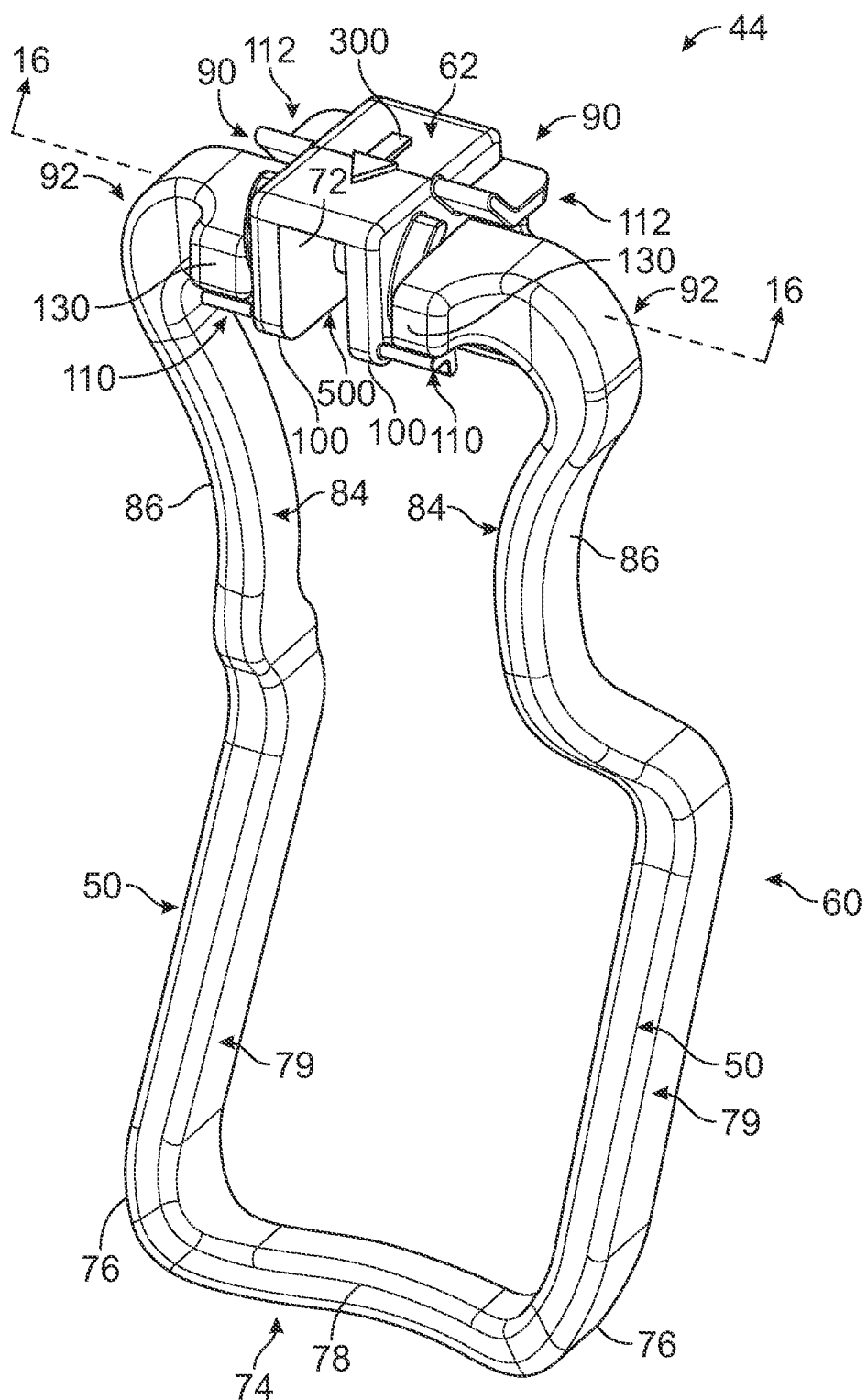
FIG. 7 is an enlarged perspective view of the lever assembly including the lever attached to the adaptor.
Figure 10:
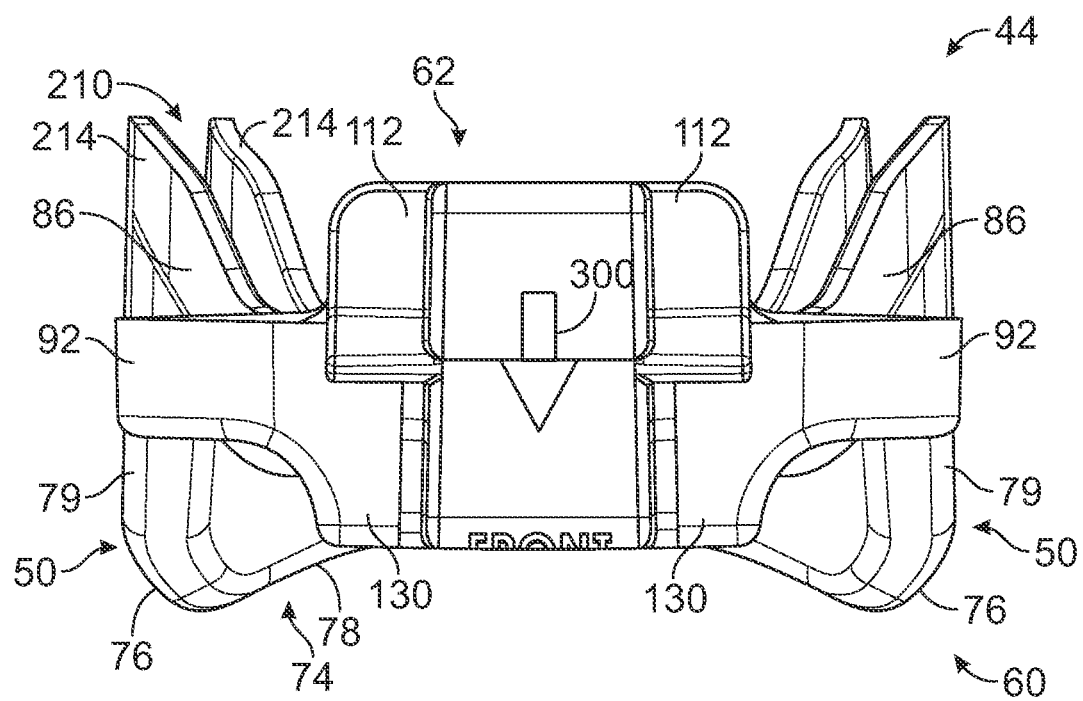
FIG. 10 is an enlarged top plan view of the lever assembly as shown in FIGS. 7-9.
Figure 11:
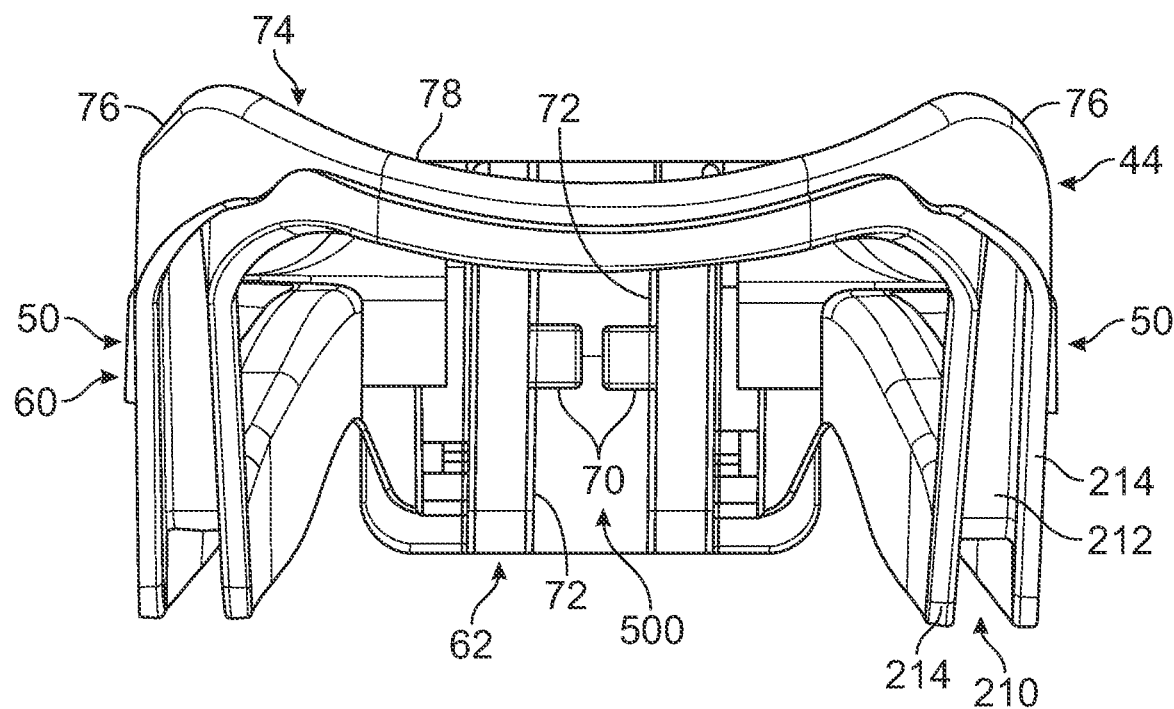
FIG. 11 is an enlarged bottom plan view of the lever assembly as shown in FIGS. 7-10.
Figure 12:
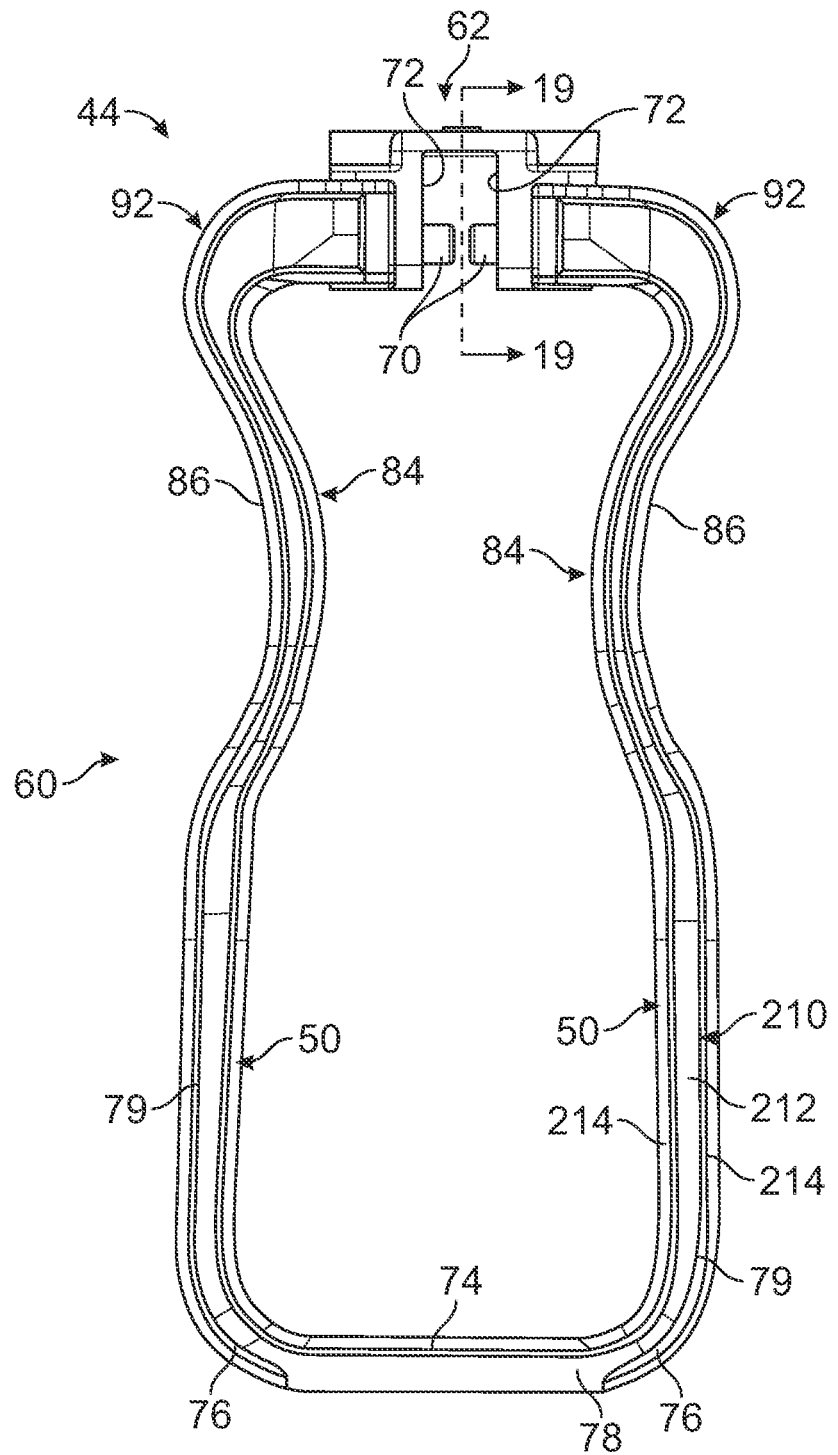
FIG. 12 is an elevated rear view of the lever assembly as shown in FIGS. 7-11.

With reference to FIGS. 7-9, the lever assembly 44 includes the lever 60 and an adaptor 62. The adaptor 62 is configured, sized, and dimensioned to attach to a variety of beverage dispensing faucets such as that as shown in FIGS. 1-6. Such a faucet includes a nozzle portion 64 or nozzle body having a cap 66 attached thereto. A displaceable plunger (not shown) is carried within the nozzle 64 and retained by the cap 66. The plunger in the nozzle 64 provides a valving function to progressively block or release the flow of beverage from the reservoir 24. The plunger in the nozzle 64 can be displaced by pulling up on a shaft or stem 68 extending through the cap 66 with the shaft being attached to the plunger. This type of faucet assembly is well known in the art such as various Tomlinson faucets that can be found at www.tomlinsonind.com and which faucets are incorporated herein by reference in their entirety.

As shown in FIG. 8, the adaptor 62 includes a pair of opposed pins 70 extending inwardly from face surfaces 72. These pins 70 are designed to engage with corresponding apertures on the shaft 68 of the faucet assembly 30. Alternatively, these pins can be configured as a rod or other compatible configuration designed to provide operative engagement with the shaft 68. While pins and rods are mentioned herein, any other configuration which currently exists or is hereafter created to engage the lever assembly 44 with the shaft 68 of a faucet assembly is considered to be included in this disclosure and fully disclosed herein.

As shown in FIG. 7, the lever assembly 44 includes the adaptor 62 for mounting to a faucet assembly as described, as well as the lever 60 that is movably attached to the adaptor 62. The lever 60 includes a pair of generally vertically extending beams 50 that have contours configured to cooperate with the beverage server 20 and provide operating benefits as described in more detail herein below. A paddle portion 74 extends between the lower portions 76 of the beams 50. The paddle portion 74 includes a curved area 78 to generally accommodate contacting the side of a cup 80 and provide a visual que to the user as to where to place the cup surface for actuating the faucet assembly to dispense beverage. The curve 78 of the paddle portion 74 is concave to receive the convex outer curve of a cup body used to operate the lever assembly.

As shown in FIG. 9, the beams 50 have an angled portion 79 extending rearwardly from the paddle portion 74 towards the body of the reservoir 24 when the lever 60 is configured as shown in FIGS. 4 and 5. This angle portion 79 facilitates placement of a cup 80 against the paddle portion 74 to actuate the lever assembly 44 but reduce the possibility of a rim 82 of the cup 80 contacting of the physical surfaces associated with the lever assembly 44. The ability to allow a user to grip a cup but not touch the lever assembly 44 while dispensing beverage helps maintain hygienic operation of the beverage server 20 and reduces the transmission of germs, viruses, microbes and other things that might be on the users hands to the operating surfaces. In this regard, the faucet assembly 44 of the present disclosure provides a contactless operation.

The beams 50 continue to extend vertically upwardly from the angle portion 79. The beam 50 extends upwardly from the angled portion 79 to a more vertically oriented upper portion 84. The upper portion 84 is generally vertically oriented in one dimension as shown in FIG. 9. In another dimension, the upper portion is curved concavely to define necked areas 86. As can be seen in FIGS. 1-3, the necked areas 86 allow the lever 60, when attached to the adaptor 62 and the shaft 68, to pass between a gap 90 between the front edges of the faucet guards 34. The complex configuration of the geometry of the lever 60 satisfies numerous requirements and provides a variety of structures to accomplish a variety of functions. Lever 60 is sized and dimensioned to allow it to move freely from the up position (see FIG. 6) to the downwardly to the "in service" position (see FIGS. 4 and 5), and vice versa. The movement between these positions is facilitated in part by the curvature of the necked area 86 in the upper portion 84. The angled portion 79 allows the beams 50 to extend forwardly from the nozzle 64 placing the paddle portion 74 in a location such that a user placing a cup 80 against the paddle portion does not contact the surfaces of the beverage server 20, including those surfaces associated with the faucet assembly 30 as well as the faucet guards 34. The geometries of the lever 60 also prove a mechanical advantage and leverage when pressing a cup 80 against the paddle portion 74 to actuate the faucet assembly 30. This configuration produces a contactless operation of the faucet assembly for hygienic purposes.

As shown in the various figures, the faucet assembly 30, including the adaptor 62 and lever 60 have structures that provide functions to provide operation of the assembly. A head 92 of the lever 60 is formed at the upper portions of the beams 50 between the corresponding outboard sides of the adaptor 62 and the necked portions 86. Opposing surfaces 94 on the heads 92 include axle members 96. The axle members are used to provide a pivotal engagement with corresponding bores 98 formed in corresponding raised portions or hubs 99 of the adaptor 62. When an adaptor 62 is attached to the shaft 68 of a faucet assembly 30, the pins 70 of the adaptor 62 engage the shaft 68. This provides some degree of movement of the adaptor 62 relative to the shaft. In operation, when the adaptor is pivoted, driving surfaces 100 on a lower portion of the adaptor 62 body engage an upper surface 102 of the cap 66 to provide a camming action lifting the shaft 68 vertically away from the nozzle portion 64 causing the seat or plunger contained within the nozzle body 64 to be controllably displaced and allow flow of fluid through the nozzle 64.

Movement of the adaptor 62 accomplished by movement of the lever 60 attached to the adaptor 62. As noted, the axles 96 engage corresponding bores 98 to provide some degree of pivoting between the lever 60 and the adaptor 62. With reference to FIGS. 9, 13-18 the adaptor 62 is formed with surfaces and structures which cooperate with the lever 60 to permit displacement of the adaptor 62 and opening of the valve. Similarly, these structures and surfaces are configured to allow displacement of the lever 60 relative to the adaptor 62 to provide displacement of the lever 60 to move it out of the way and prevent damage. As will be appreciated, the disclosed lever assembly 44 for use in the faucet assembly 30 has been configured in a manner which can be generally universal. In other words, one type of lever assembly 44 including an adaptor 62 and lever 60 can be used with a variety of faucets. This is due in part to many of the faucets used in such operations being configured in a similar manner having a nozzle body 64 with a shaft 68 which draws upwardly on a plunger retained within the nozzle body 64. In a rest or normally closed position, springs, elastomeric materials, or other structures provide a biasing function to retain the valve in a normally closed position. Lifting up on or otherwise displacing a shaft attached to such a plunger overcomes the biasing force retaining the valve in a closed condition. By displacing the plunger, the fluid retained upstream of the plunger valve is allowed to flow pass the plunger or some corresponding surface. As a result, the displacement of the shaft 68 is a generally universal structure associated with such faucets. Engagement of a lever assembly 44 as disclosed herein can be used with a wide variety of faucet systems.

As shown in the various figures, the adaptor 62 includes a first stop structure 110 and a second stop structure 112. Corresponding first and second movement surfaces 114, 116 are provided proximate to surfaces 94 on the head 92 of the lever 60, and are formed with a curvature about the central axis of the bore. The first and second movement surfaces 114, 116 provide reduced surface area structures against which the faces 94 operate. Friction reducing materials may be applied to these surfaces to enhance the smooth movement of the faces 94 against the movement surfaces 114, 116. These movement surfaces 114, 116 are provided in an arcuate form to facilitate generally consistent and balanced contact against the corresponding faces 94 as the heads 92 rotate about an axis 120 which is common to the axles 96 retained in the bores 98.

Figure 13:
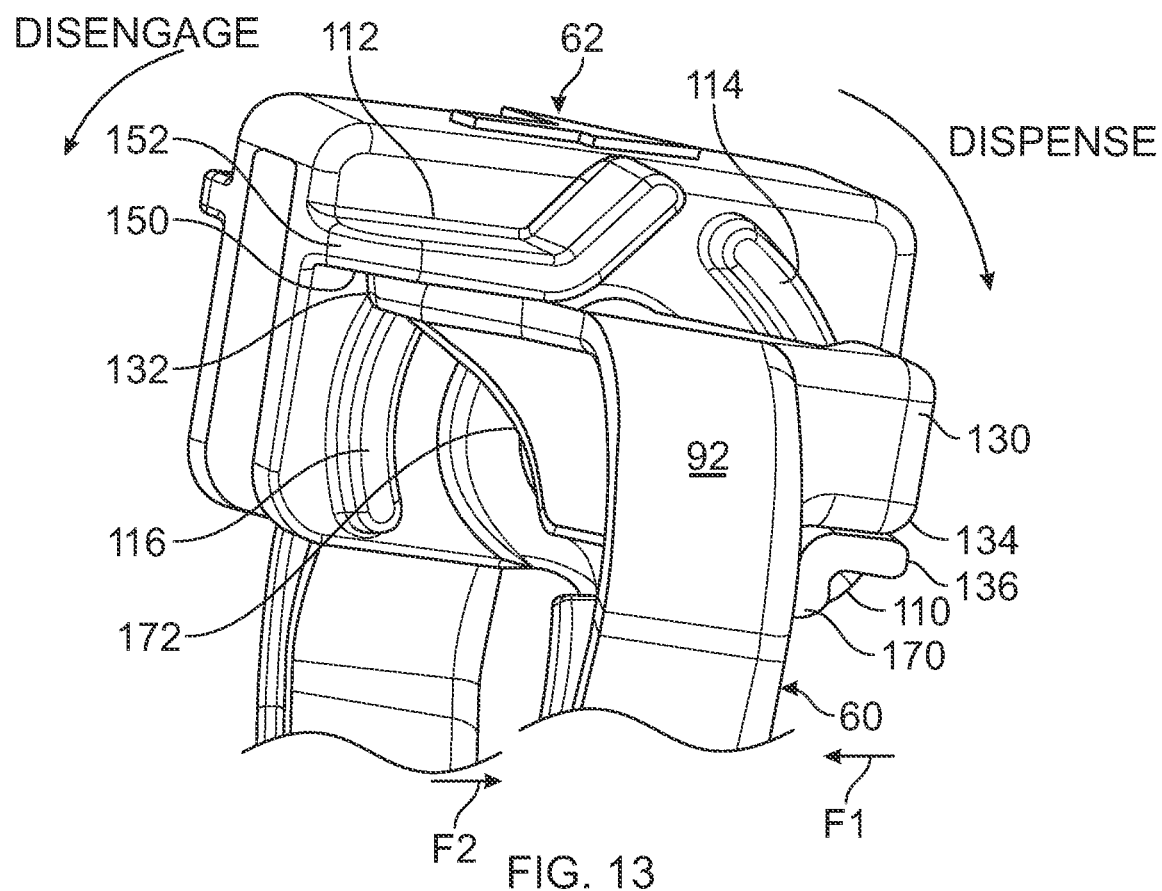
FIG. 13 is an enlarged rear perspective view of an upper portion of the lever assembly showing engagement of the upper head portion of the lever with the corresponding portion of the adaptor used to engage the lever assembly with a shaft of a faucet valve assembly.
Figure 14:
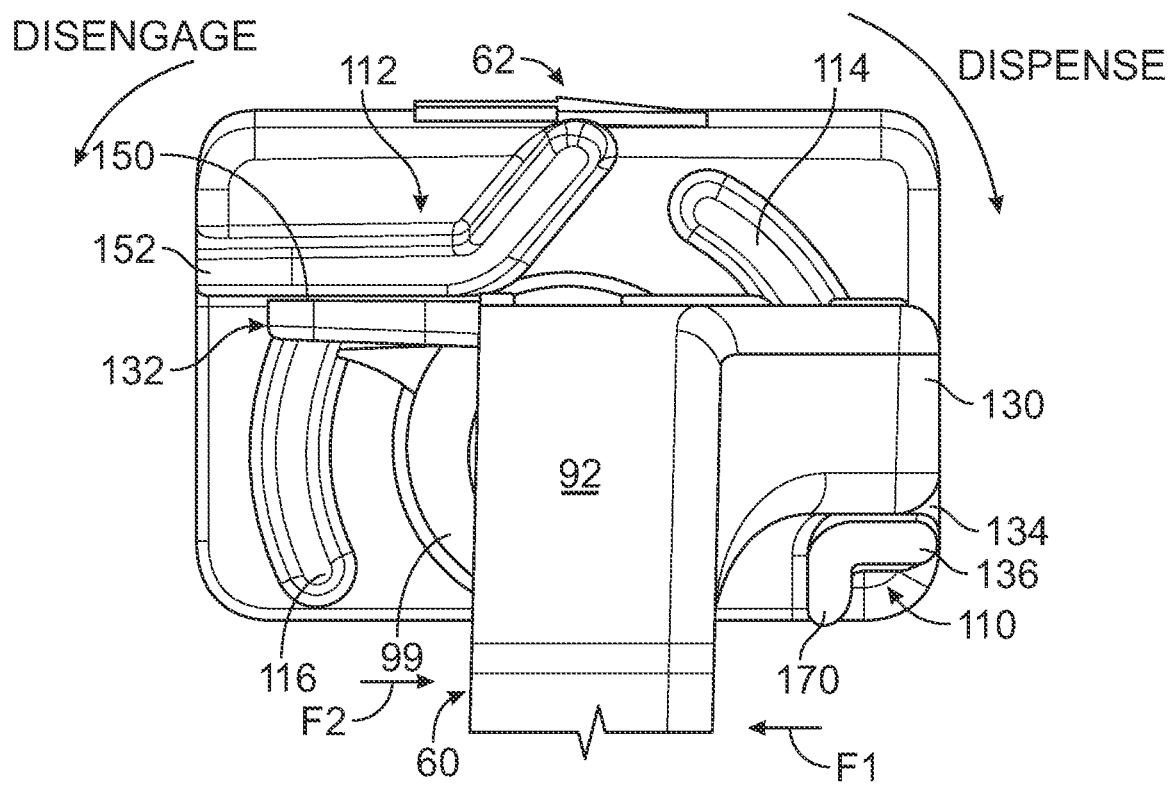
FIG. 14 is an enlarged side elevational view of the upper portion of the lever assembly as shown in FIG. 13 showing engagement of the upper head portion of the lever with the corresponding portion of the adaptor with a first rotary surface and a second rotary surface as well as a first stop structure and a second stop structure for contacting and operating with the axle portion of the head of the lever.

The head 92 includes front engaging members 130 and rear engaging members 132. The front engaging member 130 has a lower surface 134 that abuts a dispensing portion 136 of the first stop 110 when the lever 60 is actuated toward the wall of the reservoir 24 to dispense liquid from the reservoir 24. As shown in FIGS. 13 and 14, a force F1 is applied to the lever 60 causing the surface 134 to drive against the dispensing portion 136 of the stop 110. If the surface 134 was not already engaged against the corresponding surface 136 application of the force F1 against the lever 60 causes such engagement. The stopping action of the contact by these two surfaces transmits the force F1 from the lever 60, through the surfaces 134, 136, and to the adaptor 62. Further application of the force F1 causes engagement of the lower portions 100 of the adaptor 62 against the top 102 of the cap 66 causing displacement of the shaft 68 upwardly. Once the force F1 is removed from the lever 60, the biasing effect of the plunger in the nozzle 64 causes the lever 60 to return to the "out of service" or normally closed position.

In addition, a rear engaging member 132 of the head 92 engages a corresponding portion of the second stop 112. A similar rear dispensing surface 150 engages a corresponding stop surface 152 on the stop 112. As such, engagement by the front member 130 and the rear member 132 with corresponding stops 110, 112 provides controlled and distributed force application and transfer between the lever 60 and the adaptor 62. This provides balanced control and application of force on the shaft from the front of the axle as well as the rear of the axle about the axis 120 extending through the axle 96 and the bores 98.

Figure 20:
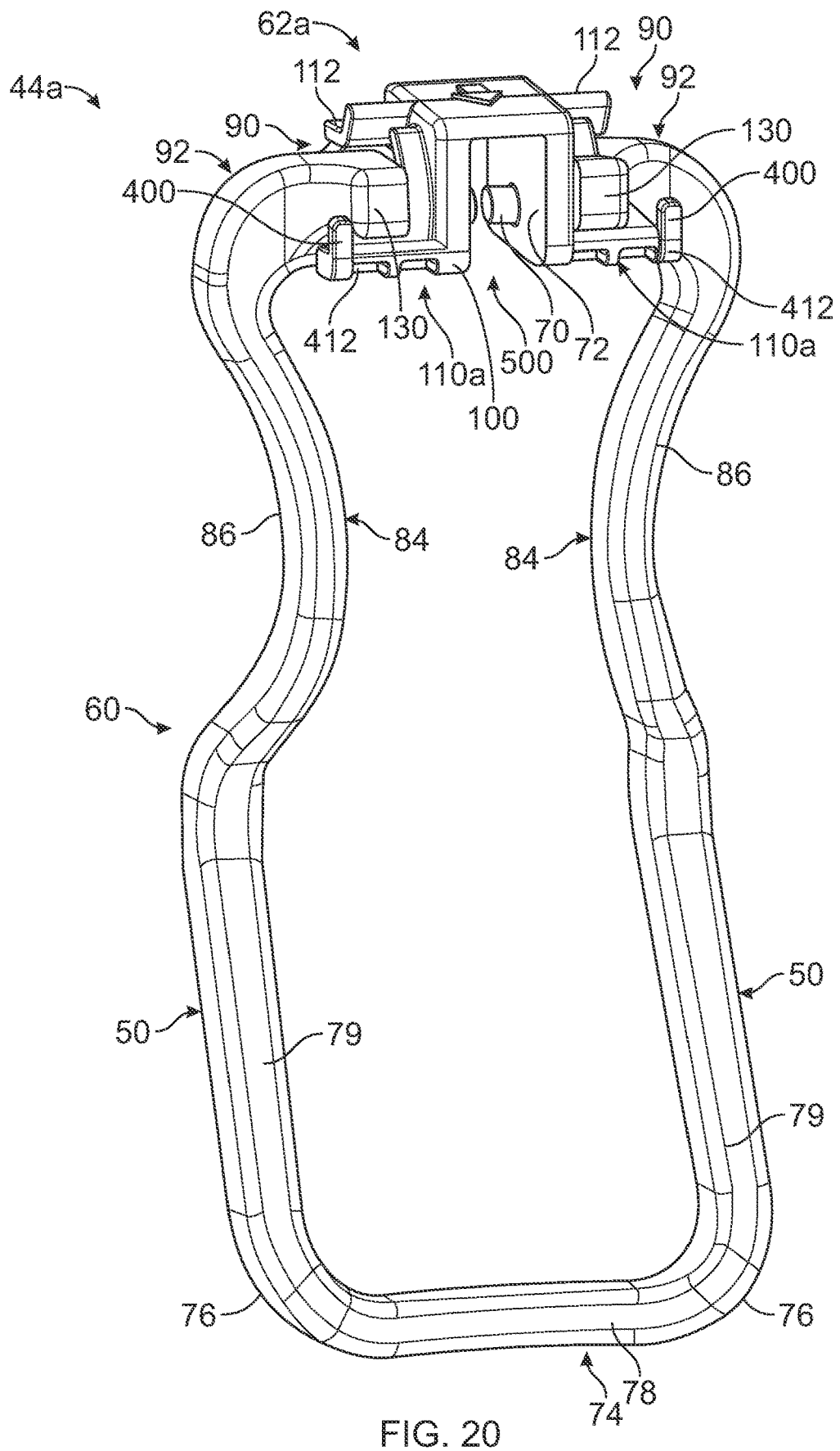
FIGS. 20-22 show an embodiment of the disclosed adaptor assembly including an additional feature on the adaptor, protrusions which work with the heads of the levers to help retain the heads in engagement with the adaptor.
Figure 21:
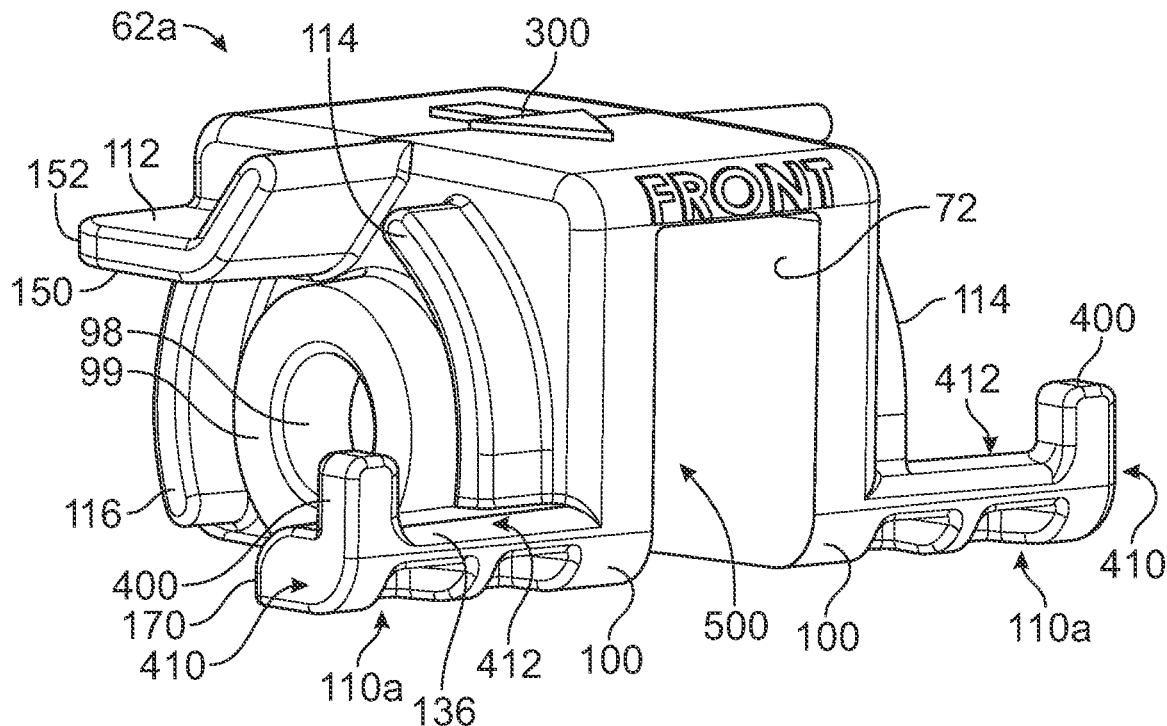
Figure 22:
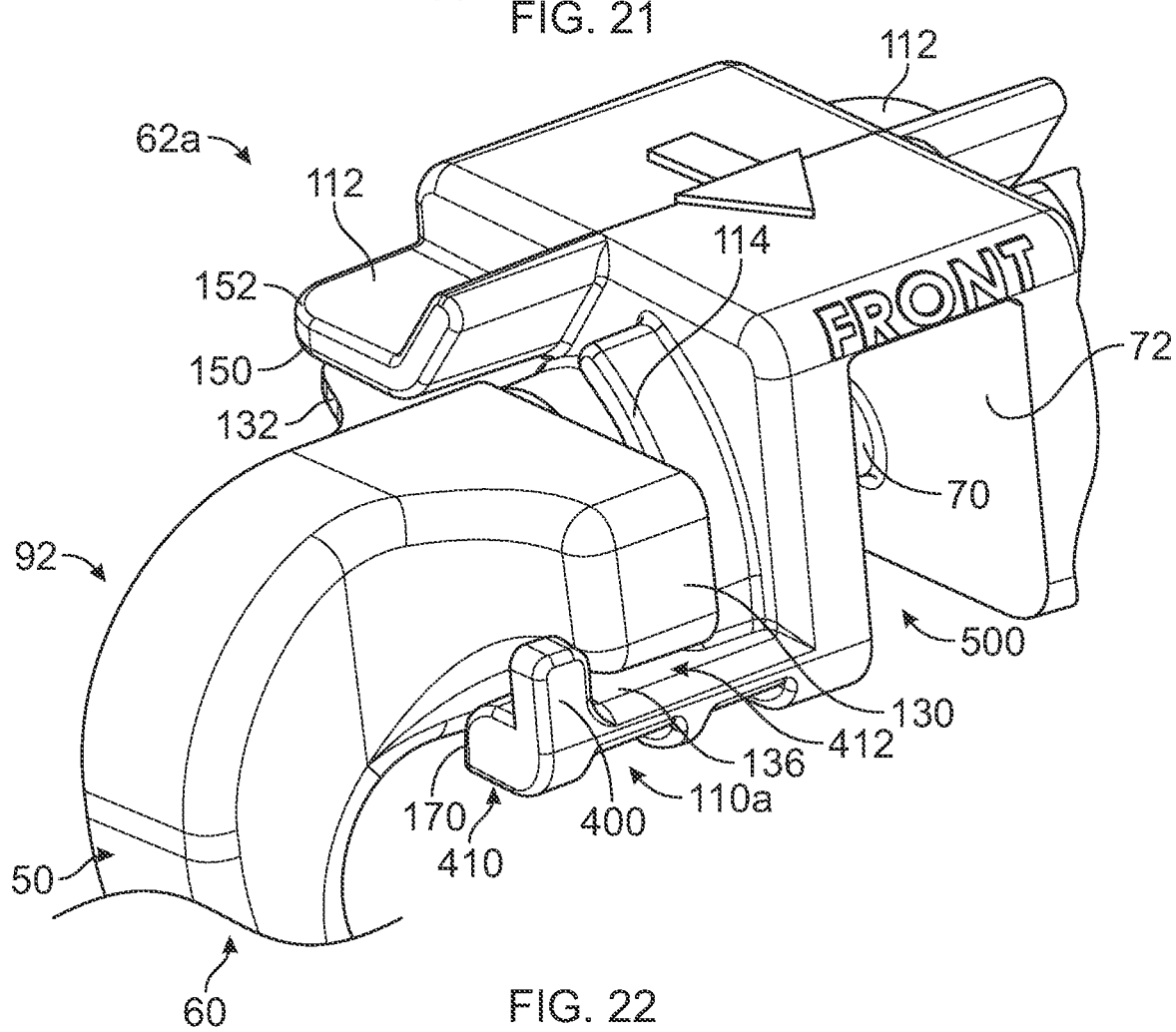

FIGS. 20-22 show another embodiment of the lever assembly 44a showing another version of the adaptor 62a for engagement with the lever 60. As used in the figures, the same reference numerals used prior to this portion of the disclosure will continue to be used for the same or similar structures. Structures that are similar but have been modified in some manner include a reference number "a" to help distinguish the similar but different components and/or structures. In this regard, as shown in FIGS. 21 and 22, the second or front stops 110a on the adaptor 62a include protrusions 400 which are positioned on an outboard portion 410 of the stops 110a. The protrusions 400 are positioned for helping retain the front engaging members 130 between the protrusion 400 and the corresponding first movement surface 114.

The remainder of the structures and functions of the lever 60 and adaptor 62a function as described hereinabove. The difference is the addition of the protrusions 400 which help to retain the front engaging members 130. The protrusions 400 and first movement surfaces 114 generally define a slot or recess 412 between which the front engaging member 130 of each head 92 can be moveably retained. In this regard, when a disengaging force F2 is applied to the lever 60 such as shown in FIGS. 13 and 14, the lever 60 and the heads 92 engaged with the corresponding adaptor 62a function in a manner as previously described with no change. In other words, the addition of the protrusions 400 does not change the operation in the disengaging mode.

However, when a force F1 is applied to the lever 60 such as shown in FIGS. 13 and 14 to actuate the valve associated with the faucet assembly 30, the force F1 on the lever 60 can create somewhat of a spreading effect at the area where the axles 96 of the heads 92 engage the bores 98. The force F1 applied for the dispensing actuation in some circumstances can cause the heads 92 to walk out of the bores against the surfaces unless there is some structure such as the protrusions 400 to prevent the spread and disengagement of the heads 92. The protrusions 400 are sized and dimensioned relative to the heads 92 to provide enough of a structure to prevent disengagement of the heads 92 from the adaptor 62a but are small enough to facilitate easy snap fit engagement of the heads 92 onto the adaptor 62. Once engaged, except for a circumstance in which a head 92 might be influenced to disengage from the adaptor 62a, the operation of the lever 62 relative to the adaptor 62a is identical to that as described hereinabove. Once again, the disengaging mode in which the lever 60 is raised relative to the adaptor 62a functions in the same manner regardless of whether the protrusions 400 are present. However, in the dispense mode in which a force F1 is applied to the lever 60 and translated to the adaptor 62a, continued application of force in some circumstances will not cause the heads 92 to spread apart and disengage from the adaptor 62a. The front engaging members 130 of the heads 92 remain engaged in the recess 412 between the corresponding movement surface 114 and the protrusion 400.

Having disclosed how the lever 60 and the adaptor 62 interact in the dispensing mode, we now turn to the operation of these structures to allow movement of the lever 60 relative to the adaptor 62 to disengage the lever 62 from its downward position and position it in an upward position. As shown in FIGS. 1-3 and 6, the lever 60 can be pivoted upwardly to disengage it from its lower hanging position to prevent is from contacting counter surfaces or other surfaces on which the beverage server 90 is placed. The lever 60 must be moved relative to the adaptor 62 but not produce any engagement that would cause displacement of the shaft 68. It is important not to produce displacement of the shaft 68 so as to prevent opening the valve when repositioning the lever. As such, the structures as disclosed relative to the adaptor 62 and lever head 92 have an additional important design criteria to facilitate pivoting movement and disengagement without dispensing.

Returning to FIGS. 13-19, the pivotal movement of the head 92 relative to the adaptor 62 in the direction opposite of dispensing can occur as the result of application of force F2 in the opposite direction of force F1 causes the lever 60 to pivot counterclockwise relative to the engagement of the axles 96 and the bores 98 about axis 120. Initially, force F2 can result from direct movement of the lever 60 away from the server reservoir 24 or by the biasing forces on the value of the faucet assembly 30 when returning to the normally closed-valve position. This movement causes relieving of the force F1 on the surfaces and the surfaces 134, 136 to effectively disengage thereby preventing dispensing. Continued additional movement by application of force F2 to the lever 60 causes the rear portion 132 to disengage from the corresponding member 152 of the stop 112 as it rotates towards a disengaging member 170 of the first stop 110.

Figure 15:
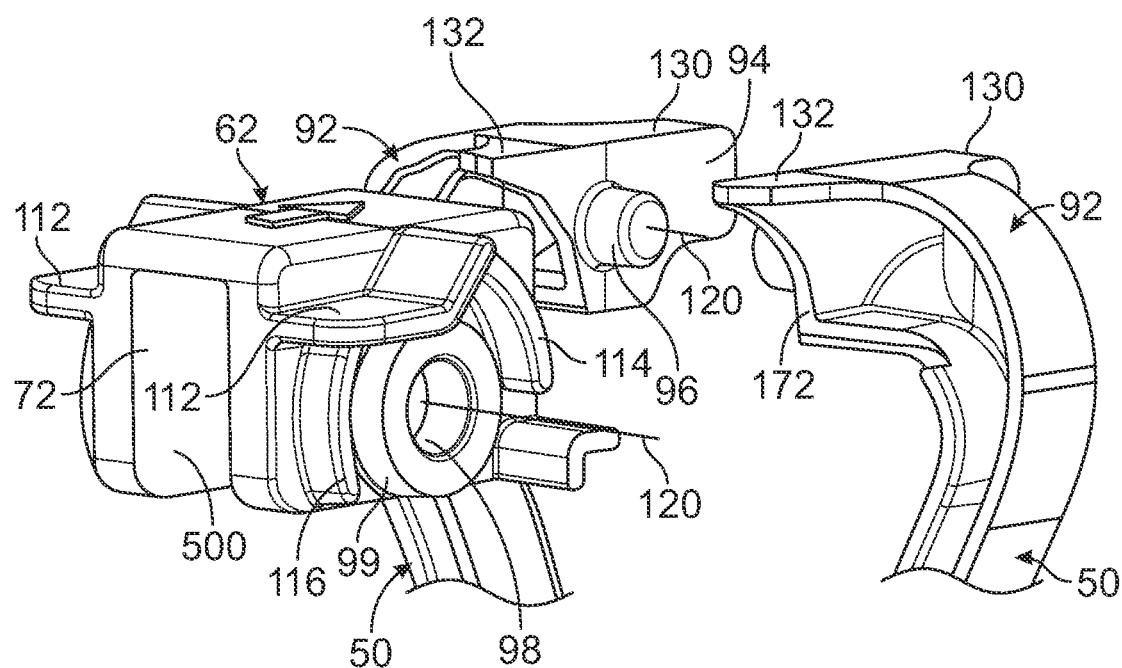
FIG. 15 is an enlarged perspective view of the lever assembly as shown in FIG. 13 in which the adaptor has been disengaged from the upper head portion of the lever to show the receiving axle portions and rotary surfaces and stop surfaces to limit the degree of travel of the lever in the up position as well as the operating position.

As shown in FIG. 15, a curved member or portion 172 of the head 92 is dimensioned to engage against the disengaging portion 170 of the stop 110. This engagement reduces the amount of movement of the lever 60 relative to the adaptor 62. As such, there is no continued movement or other engagement of the lever relative to the adaptor and therefore there is no camming action or movement of the adaptor 62 on the shaft 68. The lever assembly 44 can be configured with structures in this area to cause selectively displaceable engagement to retain the lever 60 in an upward position relative to the adaptor 62. Alternatively, these engagement structures are not provided and as such, the lever 60 can move upwardly and downwardly relative to the adaptor 62 without producing any significant engagement.

Figure 16:
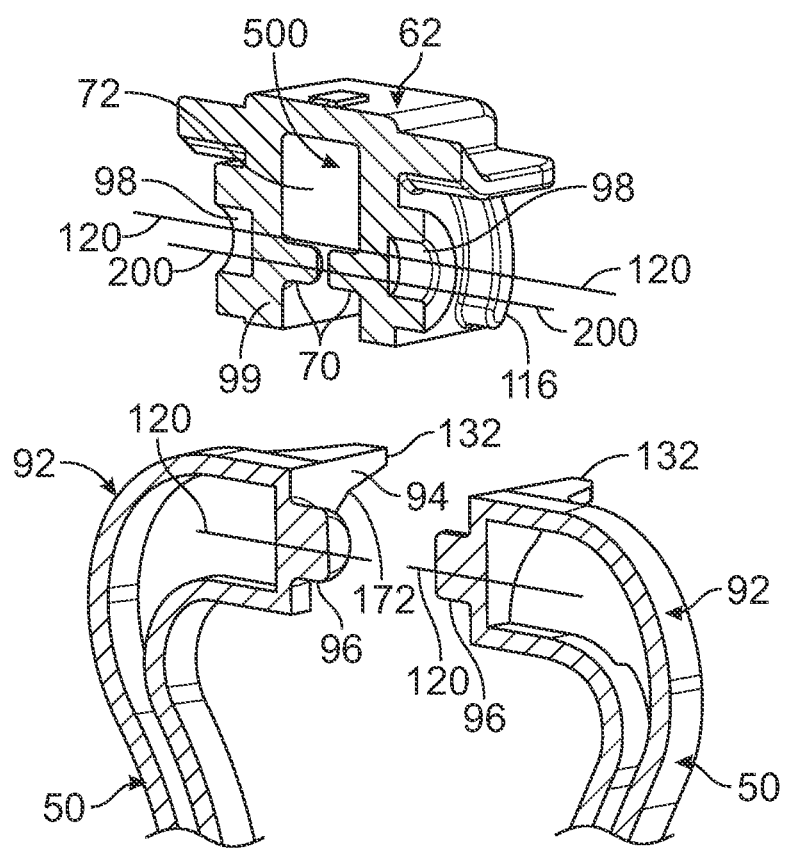
FIG. 16 is a perspective, partial fragmentary, cross-sectional view of the adaptor removed from the lever, and similar to that as shown in FIG. 15 and taken along line 16-16 in FIG. 7; the cross-section illustrating the relationship between the axle portions on the head of the lever, with the raised areas defining bores in the adaptor for receiving the axles portions, and the orientation of the axles and pins to provide a mechanical engagement and advantage when operating the lever assembly to dispense beverage.
Figure 17:
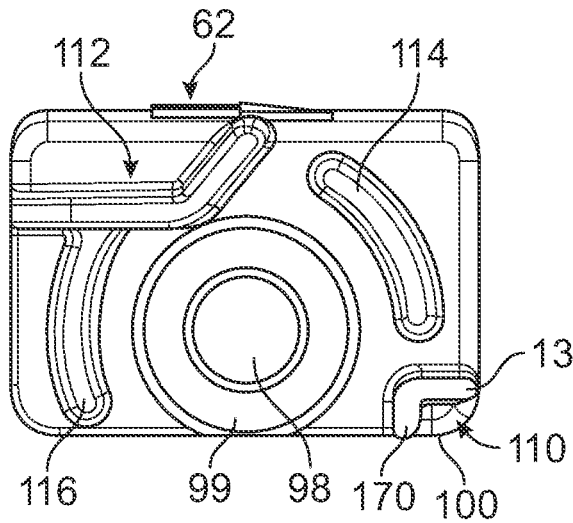
FIG. 17 is an elevations view of the adaptor shown in FIG. 14 with the lever removed from the adaptor to show the surfaces and structures on the adaptor for engagement with and operation of the upper axle portion of the lever and corresponding contact surface and structures for engagement against the stop structures.
Figure 18:
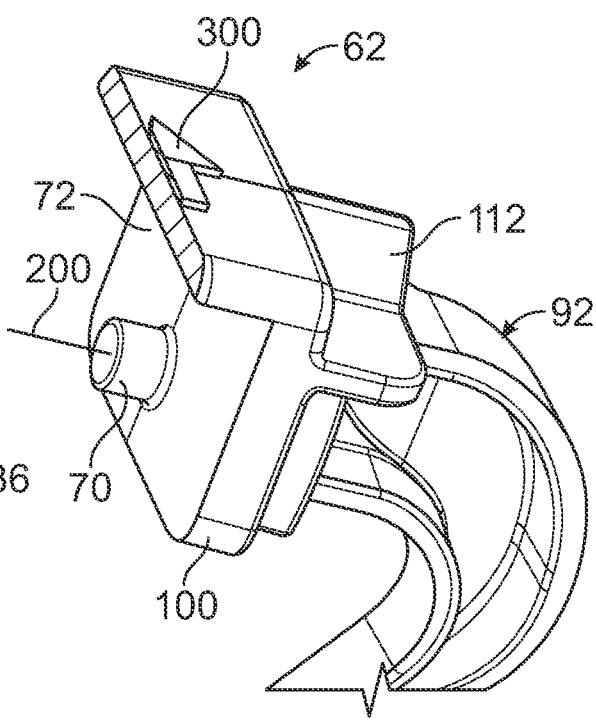
FIGS. 18 and 19 are a cross-sectional perspective views taken along line 19-19 in FIG. 12, with the view FIG. 18 rotated in perspective to show the relationship between the adaptor and the upper portion of the lever head.
Figure 19:
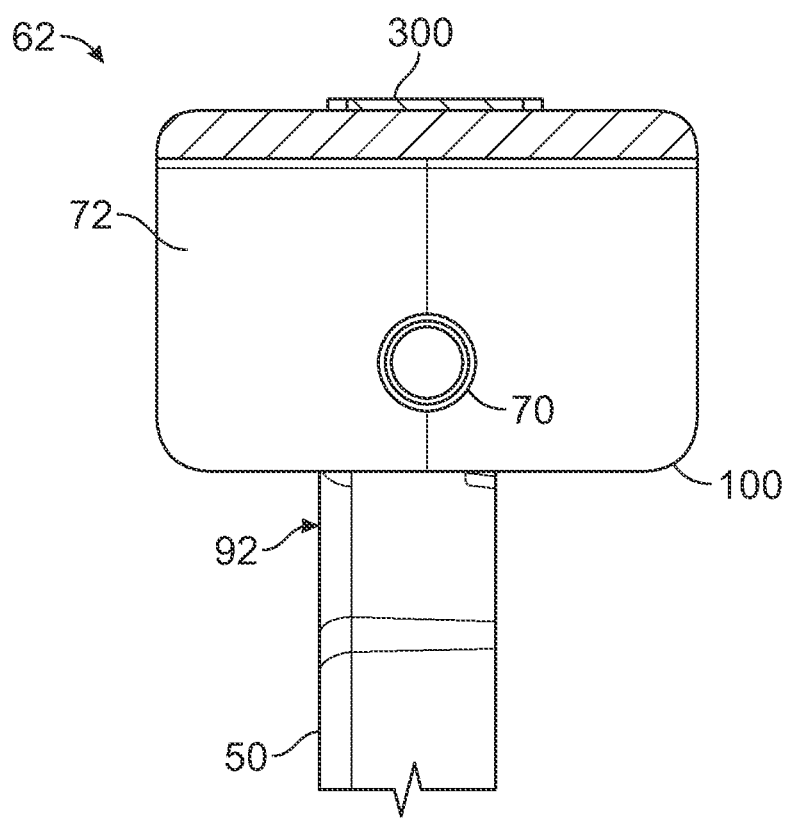

FIG. 16 further provides clarification of the axles 96 carried on the heads 92 of the lever 60. As noted above, these axles 96 engage the corresponding bores 98 formed in hubs 99 on the outer surfaces of the adaptor 62. It should be noted that the head central axis 120 extending through the bores 98 and axles 96 on the head 92 is offset from the adaptor central axis 200 extending through the pins 70 on the adaptor 62. This offset axial arrangement for the pivoting of these structures provides better mechanics for causing a cammed displacement of the shaft 68 engaged by the adaptor 62.

It should be noted the lever as shown herein is configured in a manner to provide efficient fabrication through a clamshell injection molding process. All of the structures provided on the lever 60 are configured in a manner that cooperates with a two-part mold to increase the efficiency, minimize the cost, and simplify the manufacturing aspects of the lever 60. Furthermore, the lever 60 (see FIGS. 12, 13, 15, 16, and 18) is configured with a U-shaped channel 210 defined by a wall surface 212 and a pair of spaced apart, generally parallel ribs 214. The ribs 214 provide structural support resisting pressure against the structures during the dispensing process. In other words, when a cup 80 is pressed against the paddle portion 74 the force is transferred from the paddle portion 74 upwardly along each beam 50, 50 with the ribs 214, 214 providing structural support and resiliency. The structure of the channel configuration 210 extends from either side of the paddle portion 74 upwardly along each of the beams 50, 50 to the heads 92, 92 which engage with the adaptor 62.

The use of the structures and components as disclosed in FIGS. 20-22 are virtually identical as that as described hereinabove. In addition, FIGS. 20-22 include the protrusions 400 on the outboard portions 410 of the stop structure 110a. The lever 60 is attached to the adaptor 62a by flexing the heads 92, 92 slightly apart, outwardly, and inserting the rear engaging members 132 under the corresponding second stops 112 and positioning the front engaging members 130 in the slot or recess 412 between the corresponding protrusion 400 and movement surface 114 defining the corresponding recess 412.

It should be noted that an additional feature disclosed herein is that the axles 96 on the heads 92 of the lever 60 and the opposing pins 70 formed in a channel 500 defined between the inwardly directed face surfaces 72 of the adaptor 62, 62a are sized and dimensioned to be different. The difference in the diameters, cross-sectional shape, and/or other characteristics of these two structures (the axles 96 and pins 70) prevents an incorrect assembly of the lever 60 and adaptor 60, 62a to the shaft 68 of the faucet assembly 30. In other words, this dimensional, shape, and/or other characteristics of these two structures (96, 70) provides a foolproof assembly of the lever assembly 44. If these structures (96, 70) were the same or similar, the lever 60 might be incorrectly attached directly to the shaft 68. As such, this would not operate properly and create problems for the owner/operator of the equipment. Instead, disclosed is a solution to a problem to help assure that the assembly of the lever assembly 44 to the server is always correct. In this manner, the pins 70 are sized in dimension to fit with and engage the shaft 68 of the faucet assembly. Even if the installer were to try to attach the lever 60 directly to the shaft 68, there would be a mismatch between the axles 96 and the shaft 68 signaling to the installer that something is wrong.

As noted, the lever assembly 44 can be provided as a kit for in-field retrofitting or convenient assembly during manufacturing. While the lever 60 can be pre-assembled to the adaptor (62, 62a) if it is disassembled or provided in a disassembled condition, the differential sizes, shapes and/or other characteristics of the axles 96 and pins 70 provides a structural cue to properly assemble these components together and onto the shaft 68.

In use, the lever assembly including the two components, namely, the lever 60 and the adaptor 62 can be provided as a kit to be used with any number of a variety of faucet assemblies. Once such a kit is received in the field, the operator merely removes the existing tap-handle faucet actuator that is commonly found on such faucet assemblies and replaces the tap-handle with the adaptor 62. A directional indicia 300 is provided on the adaptor 62 to help quickly and efficiently orient the operator or service person installing the adaptor 62. As shown in FIG. 7, the directional indicia 300 is in the form of an arrow pointing towards the installer. Other indicia may be provided and may include additional instructions for the installation. Alternatively, the indicia without instructions may be sufficient for an operator to make such an installation without instructions. In addition, this retrofitting of the lever assembly 44 in place of the tap-handle lever can be accomplished without tools. In other words, there is no need to include a wrench, screwdriver, pliers or other tools in order to remove the existing tap-handle. Similarly, there are no tools required to attach the adaptor 62 to the shaft 68. In addition, there are no tools required to attach the lever 60 to the adaptor 62. The lever 60 can be attached to the adaptor 62 by gently outwardly flexing the beams 50, 50 relative to each other to provide some clearance between the heads 92, 92 to attach the axles 96 in engagement with the corresponding bores 98. As long as the rear portion 132 is positioned under the second stop 112 on each side of the adaptor 62 the front portions 130, portions 130 should be properly positioned relative to the corresponding first stops 110 on each side of the front portion of the adaptor 62.

Moreover, the configuration of the lever assembly as shown and disclosed herein eliminates a top handgrip above the nozzle cap 66 to eliminate surfaces that might otherwise be contacted by a user's hand and cause contamination of the surfaces the present device in this disclosure is trying to avoid and/or eliminate. The elimination of a top handgrip required solving problems associated with this design resulting in the configurations of structures and the related functions of those structures to achieve the intended result.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. An apparatus for operating a faucet assembly in a beverage server, the apparatus comprising:
   an adaptor, the adaptor including;
      a bore having a first central axis;
      a first movement surface, the first movement surface fixed relative to the bore, and formed with a curvature about the central axis of the bore; and
      a pin along a second central axis, the second central axis vertically offset from the first central axis;
   a lever, the lever including;
      an axle, the axle configured to engage with the bore.

2. The apparatus of claim 1, wherein the lever further comprises a necked area, the necked area configured to avoid a faucet guard of the faucet assembly when the first movement surface moves relative to the lever.

3. The apparatus of claim 2, wherein the necked area is concave with respect to a plane orthogonal to the first central axis.

4. The apparatus of claim 1, wherein the adaptor further includes a second movement surface, wherein the second movement surface is formed with a curvature about the central axis of the bore.

5. The apparatus of claim 1, wherein both the adaptor and the lever are symmetrical about a plane orthogonal to the first central axis.

6. The apparatus of claim 1, wherein the paddle portion includes a curved area configured to accommodate a cup.

7. The apparatus of claim 1, wherein the adaptor further comprises a driving surface, the driving surface configured to engage a component of the faucet assembly with a camming action when a user applies a force to the lever in the direction of the beverage server.

8. The apparatus of claim 1, wherein the adaptor further comprises a front engaging member abutting a first stop located on the lever when the lever is actuated toward a wall of a reservoir.

9. The apparatus of claim 1, wherein the lever includes an upper portion and an angled portion, and the upper portion and the angled portion join at an angle lesser than an angle of a stop structure, the stop structure mounted on the adaptor.

10. An apparatus and faucet for use in a beverage server, the faucet comprising:
   a plunger;
   a shaft engaging the plunger, such that the plunger is operable from an open to a closed position by manipulating the shaft;
   the apparatus comprising:
   an adaptor, the adaptor including;
   a bore having a first central axis;
   a first movement surface, the first movement surface fixed relative to the bore, and formed with a curvature about the central axis of the bore;
   a pin along a second central axis, the second central axis vertically offset from the first central axis;
   the adaptor configured to manipulate the shaft;
   a lever, the lever including;
   an axle, the axle configured to engage with the bore.

11. A beverage server, comprising a reservoir, a faucet, and an actuating apparatus, the faucet comprising:
   a plunger;
   a shaft engaging the plunger, such that the plunger is operable from an open to a closed position by manipulating the shaft;
   the actuating apparatus comprising:
   an adaptor, the adaptor including;
      a bore having a first central axis;
      a first movement surface, the first movement surface fixed relative to the bore, and formed with a curvature about the central axis of the bore;
      a pin along a second central axis, the second central axis vertically offset from the first central axis;
      the adaptor configured to manipulate the shaft;
   a lever, the lever including;
      an axle, the axle configured to engage with the bore.

\* \* \* \* \*